United States Patent
Maier et al.

[11] 3,936,477
[45] Feb. 3, 1976

[54] BLUE ANTHRAQUINOID DISPERSE DYES, THEIR PRODUCTION AND USE

[75] Inventors: Karl Maier, Ludwigshafen; Ernst Hartwig, Heidelberg, both of Germany

[73] Assignee: BASF Aktiengesellschaft, Ludwigshafen am Rhine, Germany

[22] Filed: Aug. 28, 1974

[21] Appl. No.: 501,069

[30] Foreign Application Priority Data
Sept. 13, 1973 Germany............................ 2346047

[52] U.S. Cl.................... 260/380; 8/39 C; 8/179; 260/376
[51] Int. Cl.².................. C07C 97/26; C07C 101/80
[58] Field of Search............................ 260/376, 380

[56] References Cited
UNITED STATES PATENTS

| | | | |
|---|---|---|---|
| 3,329,692 | 7/1967 | Ramanathan........................ | 260/380 |
| 3,652,601 | 3/1972 | Gertisser............................ | 260/380 |
| 3,752,831 | 8/1973 | Diamantoglou...................... | 260/376 |

*Primary Examiner*—Arthur P. Demers
*Attorney, Agent, or Firm*—Johnston, Keil, Thompson & Shurtleff

[57] ABSTRACT

Anthraquinoid disperse dyes of formula:

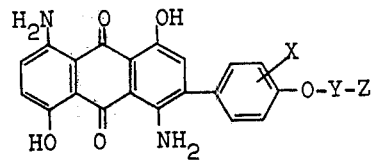

in which
X is hydrogen, chloro, methyl, methoxy or ethoxy;
Y is alkylene of two to eight carbon atoms or $-(CH_2)_2-O-(CH_2)_2-$; and
Z is CN or COOH.

The dyes give deep blue colorations of high fastness to light and heat setting on synthetic materials and particularly those of linear polyesters. The dyeings have a neutral evening shade which is not displaced toward red.

5 Claims, No Drawings

BLUE ANTHRAQUINOID DISPERSE DYES, THEIR PRODUCTION AND USE

The invention relates to new blue anthraquinoid disperse dyes based on 1,5-diamino-4,8-dihydroxyanthraquinone and to their production and use.

The new dyes have the formula:

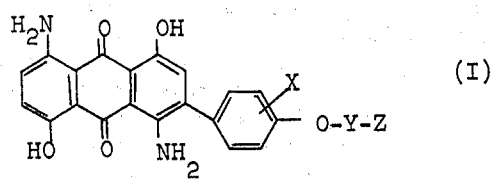

in which

Y is saturated alkylene of two to eight carbon atoms or —$(CH_2)_2$—O—$(CH_2)_2$—;

Z is CN or COOH; and

X is hydrogen, chloro, methyl, methoxy or ethoxy.

The dyes dye synthetic fibrous material of polyamide or cellulose acetate and particularly of linear polyesters full blue shades. The dyeing obtained have a very high light fastness and excellent fastness to dry-heat pleating and setting. On fibrous material of linear polyesters the dyeings have an evening shade which is not displaced toward red.

The alkylene radical Y may be linear or branched.

Dyes of the formula (I) are particularly preferred in which Y is —$CH_2$—$CH_2$— or —$CH_2$—$CH_2$—O—$CH_2$— and X is hydrogen.

The new dyes may be prepared for example

A. by the reaction of 4,8-diamino-1,5-dihydroxyanthraquinone-2,6-disulfonic acid or an alkali metal salt or ammonium salt of the same with a phenol ether of the formula:

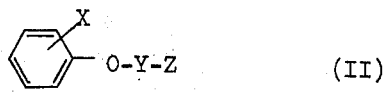

in which X, Y and Z have the above meanings in a mixture of sulfuric acid and boric acid; or B. by the reaction of the quinonimine derivative obtained by oxidation of 4,8-diamino-1,5-dihydroxyanthraquinones with pyrolusite with a phenol ether of the formula (II) by a conventional method.

The process (A) is preferred for industrial reasons.

The same dye is obtained by both methods. They do not differ either tinctorially or in physical properties such as the melting point (mixed melting point) or the spectrum in visible or infrared light.

According to the disclosure in Indian J. Chem. 9, (1971), pages 1060 to 1063 the reaction (A) introduces the phenyl radical into the ortho-position to the amino group.

The reaction according to (A) takes place in a mixture of boric acid and concentrated sulfuric acid or monohydrate in the ratio of from 1:5 to 1:20 parts by weight. The sulfonic acid is placed in the mixture of boric acid and sulfuric acid and the phenol ether (II) is added at a low temperature, preferably at from —10° to +10°C. The reaction is over as a rule within from one hour to three hours at from 0° to +10°C.

The reaction mixture is added to ice and a mixture of ice and water and the diluted reaction mixture is heated for several hours at from 80°C to the boiling point of the mixture. After cooling the reaction product is separated and washed with water until neutral. The reaction product obtained, which is the monosulfonic acid of (I), is dissolved in dilute aqueous ammonia solution and then sodium dithionite is added and the mixture is heated at from 90° to 95°C so that the sulfo group is eliminated. After cooling the dye is suction filtered and washed until neutral.

According to method (B) the 1,5-diamino-4,8-dihydroxyanthraquinone is first oxidized in concentrated sulfuric acid at a temperature of about 0°C with pyrolusite into the corresponding quinonimine and the imine obtained is reacted at a low temperature, preferably of from —30°C to 0°C with the phenol ether (II). The dye is precipitated in a conventional manner from the reaction mixture by pouring the latter into ice or ice-water and isolated.

Phenol ethers (II) which may be used for the process include: β-phenoxypropionitrile, β-(β'-phenoxyethoxy)-propionitrile, β-(m-cresoxyethoxy)-propionitrile, β-(m-cresoxy)-propionitrile, β-(o-ethoxyphenoxyethoxy)-propionitrile, β-(m-chlorophenoxyethoxy)-propionitrile, γ-phenoxybutyronitrile, δ-phenoxyvaleronitrile, ε-phenoxycapronitrile, ε-phenoxy- γ-methylcapronitrile, ω-phenoxyoenanthonitrile, δ-(m-cresoxy)-valeronitrile and the corresponding carboxamides and carboxylic acids of the abovementioned nitriles. When starting from a nitrile, it is also possible to obtain according to the abovementioned methods, mixtures of dyes which contain the nitrile and the corresponding carboxylic acid.

The ratio is dependent on the reaction conditions. The corresponding carboxamides are not formed. When starting from an amide however the corresponding carboxylic acid is always obtained.

The new blue dyes dye linear polyesters full blue shades which are fast to light and particularly fast to heat setting. They are suitable for both the high temperature method and for the carrier dyeing method. They are also suitable for printing on polyester fibers.

The invention is further illustrated by the following Examples. Parts and percentages hereinafter referred to are by weight.

EXAMPLE 1 (Method (A))

20 parts of 4,8-diamino-1,5-dihydroxyanthraquinone-2,6-disulfonic acid is introduced at 50° to 60°C into a solution of 10 parts of boric acid in 100 parts of 96% sulfuric acid. After it has all dissolved the mixture is cooled to 0°C, 12 parts of β-phenoxypropionitrile is introduced within fifteen minutes at 0° to 5°C and the whole is stirred for another hour at the said temperature. The reaction mixture is then poured into 600 parts of ice-water and the mixture is heated for two hours at the boiling point. 120 parts of sodium chloride is then added and the whole is cooled. The precipitate is suction filtered. The filter residue is washed with a common salt solution until neutral and then stirred into 300 parts of water. 25 parts of a 25% ammonia solution and 11 parts of sodium dithionite are added and the whole is heated at from 90° to 95°C for two hours and then cooled. The precipitate is suction filtered and washed with water until neutral. The yield is 14 parts of the dye of the formula (I) in which X is hydrogen and —O—Y—Z is O—$CH_2$—$CH_2$—CN. It has a melting point of 243° to 244°C after it has been recrystallized from chlorobenzene. The dye gives full blue dyeings which are fast to light and to heat setting on linear polyester fibrous material.

EXAMPLE 2 (Method (B))

18 parts of pyrolusite is introduced within thirty minutes at 0° to 5°C into a solution of 28.6 parts of 4,8-diamino-1,5-dihydroxyanthraquinone in 500 parts of concentrated sulfuric acid. Excess of pyrolusite is then filtered off and the residue is washed with 350 parts of 96% sulfuric acid. The combined filtrates cooled to −30°C have added thereto within twenty minutes 24.6 parts of β-(β′-phenoxyethoxy)-propionitrile and the mixture is stirred for another two hours at −30°C. The reaction mixture is then poured onto ice and the precipitate is filtered off and washed with water until it is neutral. The yield is 40 parts of the dye of the formula:

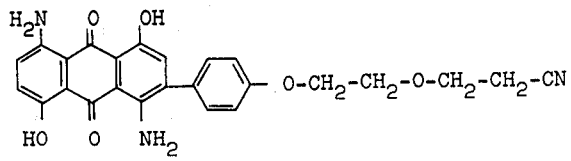

It has a melting point of 205° to 207°C after it has been recrystallized from xylene.

The dye gives dyeings of high fastness to heat setting on linear polyester fibrous material.

EXAMPLE 3 (Method (A))

20 parts of 4,8-diamino-1,5-dihydroxyanthraquinone-2,6-disulfonic acid is dissolved at 65° to 70°C in a solution of 10 parts of boric acid in 100 parts of 96% sulfuric acid. After the whole has been cooled to 0° to 5°C 15.6 parts of β-(β′-phenoxyethoxy)-propionitrile is dripped in, stirred for one hour at 0° to 5°C, the whole is added to 600 parts of ice-water, boiled for two hours and the product is salted out at 80°C by adding common salt (salt concentration about 20%). After cooling the precipitate is suction filtered and washed with a 20% solution of common salt. The filter residue is stirred into 400 parts of water, then 60 parts of 25% aqueous ammonia solution and 11 parts of sodium dithionite are added and the whole is heated for two hours at from 90° to 95°C. The product is worked up as described in Example 1. The yield is 14 parts of the same dye as in Example 2. The melting point is 201° to 202°C after it has been recrystallized from chlorobenzene. The mixed melting point with the dye of Example 2 is 203° to 204°C. The dye has exactly the same tinctorial behavior as the dye obtained according to Example 2.

The phenol ethers (II) specified in the following Table are reacted with 4,8-diamino-1,5-dihydroxyanthraquinone-2,6-disulfonic acid in a mixture of boric acid and sulfuric acid as described in Example 1 or Example 3. In each case method (A) is used. Ex = Example No. Y = yield based on 20 parts of 4,8-diamino-1,5-dihydroxyanthraquinone-2,6-disulfonic acid. The dye in Example 9 is identical with that obtained in Example 8. m.p. = melting point in °C; recrystallized from the solvent indicated in parenthesis.

EXAMPLES 4 TO 16

| Ex | Phenol ether (II) | Y | m.p. |
|---|---|---|---|
| 4 | γ-phenoxybutyronitrile | 14 | 252–253 |
| 5 | δ-phenoxyvaleronitrile | 17.5 | 217–218 |
| 6 | ε-phenoxycapronitrile | 13.5 | 241–242 |
| 7 | ω-phenoxyenanthonitrile | 16 | 213–214 |
| 8 | β-phenoxypropionic acid | 14.5 | 243–244 (nitrobenzene) |
| 9 | β-phenoxypropionamide (in 96% sulfuric acid) | 12.5 | 239–240 243–244 (nitrobenzene) |
| 10 | β-phenoxypropionamide (in monohydrate) | 14 | 244–245 (nitrobenzene) |
| 11 | δ-m-cresoxyvaleronitrile | 8.5 | 209–210 (anisol) |
| 12 | β-(m-cresoxyethoxy)-propionitrile | 11.5 | 206–207 (toluene) |
| 13 | β-(m-cresoxy)-propionitrile | 11 | 213–217 (toluene) |
| 14 | β-(o-ethoxyphenoxyethoxy)-propionitrile | 13 | 126–128 (benzene) |
| 15 | ε-phenoxy-γ-methylcapronitrile | 17 | 210–212 (chlorobenzene) |
| 16 | β-(m-chlorophenoxyethoxy)-propionitrile | 13 | |

Dyes of the formula:

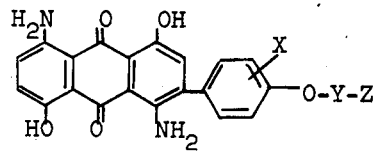

in which X, Y and Z have the following meanings are obtained:

| Example | X | —Y—Z |
|---|---|---|
| 4 | H | —(CH₂)₃—CN |
| 5 | H | —(CH₂)₄—CN |
| 6 | H | —(CH₂)₅—CN |
| 7 | H | —(CH₂)₆—CN |
| 8 | H | —(CH₂)₂—COOH |
| 9 | H | —(CH₂)₂—COOH |
| 10 | H | —(CH₂)₂—COOH |
| 11 | m-CH₃ | —(CH₂)₄—CN |
| 12 | m-CH₃ | —(CH₂)₂—O—CH₂—CH₂CN |
| 13 | m-CH₃ | —CH₂—CH₂—CN |
| 14 | o-H₅C₂O— | —(CH₂)₂—O—CH₂—CH₂—CN |
| 15 | H | —(CH₂)₂—CH—(CH₂)₂—CN<br>　　　　　　│<br>　　　　　　CH₃ |
| 16 | m-Cl | —(CH₂)₂—O—CH₂—CH₂—CN |

EXAMPLE 17

18 parts of pyrolusite is introduced at 0° to 5°C within thirty minutes into a solution of 28.6 parts of 4,8-diamino-1,5-dihydroxyanthraquinone in 490 parts of 96% sulfuric acid. Undissolved material is then suction filtered andd the residue is washed with 320 parts of 96% sulfuric acid. The combined filtrates are cooled to −30°C and 21 parts of β-phenoxypropionitrile is added within twenty minutes at this temperature. The whole is stirred for another two hours at −30°C. The reaction mixture is then poured out onto ice and the precipitated dye is suction filtered and washed with water until it is neutral. After recrystallization from chlorobenzene or xylene a product is obtained which melts at 238° to 240°C. The dye is identical with that obtained according to Example 1 (no melting point depression).

We claim:

1. A dye of the formula:

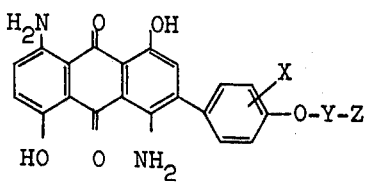

in which
X is hydrogen, chloro, methyl, methoxy or ethoxy;
Y is saturated alkylene of two to eight carbon atoms or $-(CH_2)_2-O-(CH_2)_2-$;
and
Z is $-CN$ or $-COOH$.

2. A dye as claimed in claim 1 in which Z is $-CN$ and X and Y have the meanings given in claim 1.

3. A dye of the formula given in claim 1 in which Y is $-CH_2-CH_2-$ or $-CH_2-CH_2-O-(CH_2)_2-$.

4. A dye of the formula:

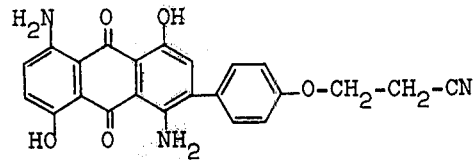

5. A dye of the formula:

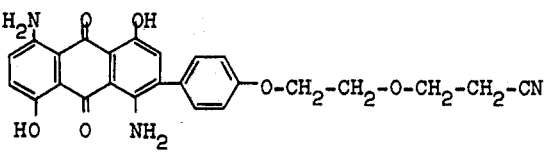

* * * * *